(12) United States Patent
Bertizzolo et al.

(10) Patent No.: US 12,250,647 B2
(45) Date of Patent: Mar. 11, 2025

(54) DYNAMIC POWER BUDGET ALLOCATION USING INDIVIDUALIZED MTPL PER RADIO LINK FOR UPLINK TRANSMISSION

(71) Applicant: Apple Inc., Cupertino, CA (US)

(72) Inventors: Lorenzo Bertizzolo, Campbell, CA (US); Prashant H. Vashi, San Jose, CA (US); Ioannis Pefkianakis, San Jose, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 17/932,666

(22) Filed: Sep. 15, 2022

(65) Prior Publication Data

US 2024/0098654 A1    Mar. 21, 2024

(51) Int. Cl.
*H04W 52/36* (2009.01)
*H04W 52/14* (2009.01)
*H04W 52/26* (2009.01)

(52) U.S. Cl.
CPC ....... *H04W 52/367* (2013.01); *H04W 52/146* (2013.01); *H04W 52/267* (2013.01)

(58) Field of Classification Search
CPC .......... H04W 52/367; H04W 52/146; H04W 52/267
USPC ........................................... 455/522
See application file for complete search history.

(56) References Cited

U.S. PATENT DOCUMENTS

| | | | |
|---|---|---|---|
| 2008/0233992 A1* | 9/2008 | Oteri | H04W 52/262 455/522 |
| 2009/0197632 A1* | 8/2009 | Ghosh | H04W 52/34 455/522 |
| 2013/0324182 A1* | 12/2013 | Deng | H04W 52/242 455/522 |
| 2014/0023010 A1* | 1/2014 | Loehr | H04W 52/365 370/329 |
| 2014/0235259 A1* | 8/2014 | Salami | H04W 52/367 455/522 |
| 2014/0362744 A1* | 12/2014 | Yan | H04B 7/26 370/280 |
| 2014/0369320 A1* | 12/2014 | Gurcan | H04W 72/0466 370/335 |
| 2015/0124765 A1* | 5/2015 | Rong | H04W 72/0473 370/329 |
| 2015/0271824 A1* | 9/2015 | Zhang | H04W 52/367 370/329 |

(Continued)

*Primary Examiner* — April G Gonzales
(74) *Attorney, Agent, or Firm* — DICKINSON WRIGHT RLLP

(57) ABSTRACT

This application describes methods and apparatus to allocate uplink (UL) power dynamically across multiple parallel radio frequency links for wireless devices. The wireless device sets an initial maximum transmit power level (MTPL) for each UL radio link of multiple radio links used for UL traffic based on a duty cycle prediction for the respective UL radio link. The wireless device adjusts the initial MTPL for each UL radio link based on a predicted data throughput for the UL radio link relative to a total predicted data throughput for all UL radio links. The adjusted MTPL for each UL radio link can be also reduced when the UL radio link uses UL multiple input multiple output (MIMO) transmission via multiple antenna ports, e.g., by apportioning the adjusted MTPL among the multiple antenna ports of the UL radio link equally.

20 Claims, 9 Drawing Sheets

(56) References Cited

U.S. PATENT DOCUMENTS

| | | | | |
|---|---|---|---|---|
| 2016/0112961 A1* | 4/2016 | Zhang | ............... | H04W 52/242 |
| | | | | 455/522 |
| 2016/0255594 A1* | 9/2016 | Vajapeyam | ......... | H04W 52/346 |
| | | | | 455/522 |
| 2017/0142663 A1* | 5/2017 | Salami | ............... | H04W 72/04 |
| 2017/0142690 A1* | 5/2017 | Salami | ............... | H04W 52/367 |
| 2017/0257787 A1* | 9/2017 | Regueira Caumel | ............... | |
| | | | | H04W 24/10 |
| 2020/0305091 A1* | 9/2020 | Lee | ............... | H04W 52/0212 |
| 2020/0336987 A1* | 10/2020 | Mukherjee | ......... | H04W 52/367 |
| 2020/0389848 A1* | 12/2020 | Ji | ............... | H04L 1/203 |
| 2021/0144715 A1* | 5/2021 | Gotoh | ............... | H04L 1/0004 |
| 2021/0185621 A1* | 6/2021 | Krenz | ............... | H04W 52/367 |
| 2022/0159582 A1* | 5/2022 | Lu | ............... | H04W 52/262 |
| 2022/0386249 A1* | 12/2022 | Meshkati | ............ | H04W 52/367 |
| 2024/0205095 A1* | 6/2024 | Bertizzolo | ............ | H04L 41/122 |

\* cited by examiner

DYNAMIC POWER BUDGET ALLOCATION USING INDIVIDUALIZED MTPL PER RADIO LINK FOR UPLINK TRANSMISSION

RELATED APPLICATIONS

This application is related to U.S. patent application Ser. No. 17/720,581 entitled "DYNAMIC MAXIMUM TRANSMISSION POWER" filed Apr. 14, 2022, the contents of which is incorporated by reference herein in its entirety for all purposes.

FIELD

The described embodiments relate to wireless communications, including methods and apparatus to allocate a power budget dynamically among multiple radio links using an individualized maximum transmit power level (MTPL) per radio link for uplink transmission.

BACKGROUND

Newer generation, e.g., fifth generation (5G) new radio (NR), cellular wireless networks that implement one or more $3^{rd}$ Generation Partnership Project (3GPP) 5G standards are rapidly being developed and deployed by network operators worldwide. The newer cellular wireless networks provide a range of packet-based services, with 5G technology providing increased data throughput and lower latency connections that promise enhanced mobile broadband services for 5G-capable wireless devices. The higher data throughput and lower latency of 5G is expected to usher in a range of new applications and services as well as improve existing ones. Mobile network operators (MNOs) are deploying 5G technology in stages and will continue to offer earlier generation, e.g., fourth generation (4G) Long Term Evolution (LTE), connectivity in parallel with 5G. In addition, 5G cellular connectivity can use two distinct radio frequency (RF) bands, a first RF band below 8 GHz providing lower data rates over longer ranges and a second RF band above 24 GHz providing higher data rates over shorter ranges. A wireless device can connect to a cellular wireless network using multiple, parallel radio links (each radio link referred to as a component carrier) via a single radio access technology (RAT), e.g., via 4G LTE or via 5G new radio (NR) using carrier aggregation via the respective RAT. A wireless device can also connect using two different RATs in parallel, e.g., one or more 4G LTE radio links in parallel with one or more 5G radio links, where each radio link can have its own associated radio frequency carrier. Uplink communication via multiple radio links can include data traffic for different applications that have different requirements. Total uplink transmit power for all radio links (across all carriers used) can be limited to ensure regulatory compliance for human exposure to radio frequency signals averaged over a time period. Temporary excursions of instantaneous transmit power levels that exceed an average power limit can be allowed during the time period as long as the averaged total uplink transmit power meets the regulatory requirements. Transmitting at a maximum permitted power level, however, can exhaust a power budget for a time period prematurely, requiring reduction of the transmit power to a fallback level for a remainder of the time period, which can impact data throughput and connectivity stability. Similarly, consumption of power by some radio links can use up the allowed transmit power budget during a time period affecting other radio links that share the same transmit power budget. There exists a need for mechanisms to allocate uplink transmit power dynamically among multiple radio links.

SUMMARY

This application relates to wireless communications, including methods and apparatus to allocate uplink transmit power dynamically across multiple parallel radio links for wireless devices. Each radio link can have its own radio frequency carrier, and allocation of uplink transmit power among the radio links can be apportioned on a per radio link (e.g., per-carrier) basis. In a 4G LTE cellular wireless network, a wireless device can connect using multiple radio links using uplink carrier aggregation (ULCA) to transport uplink (UL) data via multiple component carriers simultaneously. In a 5G standalone (SA) cellular wireless network, a wireless device can connect using multiple radio links via ULCA using multiple component carriers of a given frequency band, e.g., within a Frequent Range 1 (FR1) band. In a 5G non-standalone (NSA) cellular wireless network, a wireless device can establish parallel radio links using two different radio access technologies (RATs), e.g., using one or more 5G new radio (NR) links and one or more 4G LTE radio links, simultaneously. Uplink transmit power of the wireless device averaged over an averaging time period is constrained by regulatory requirements to not exceed a power level $P_{average}$ to limit human exposure to radio frequencies. The wireless device can temporarily transmit above $P_{average}$, up to a maximum power level $P_{max}$ determined based on limitations of wireless circuitry hardware of the wireless device, and return to lower transmit power levels, in some cases down to a fallback power level $P_{fallback}$ to meet the regulatory requirements for the total UL transmit power level averaged over the averaging time period. The wireless device estimates consumed transmit power of a transmit power budget based on monitoring duty cycle usage for past time periods and predicts a duty cycle for a future time period as a proxy to estimate future UL transmit power consumption. The wireless device sets an initial maximum transmit power level (MTPL) for each UL radio link of multiple radio links used for UL traffic based on a duty cycle prediction for the respective UL radio link. UL radio links having a lower duty cycle can be assigned a higher initial MTPL to allow for higher UL transmit power levels over a portion of the time period, as the lower duty cycle indicates the UL radio link does not require active transmission over the entire time period. UL radio links having a higher duty cycle can be assigned a lower initial MTPL to allow for transmitting for a longer time, e.g., up to the entire time period, without exhausting a power budget. The initial MTPL can be calculated for each UL radio link independently. The wireless device must continue to meet a total UL transmit power limit during an averaging time period for all UL radio links combined together. The wireless device adjusts the initial MTPL for each UL radio link based on a predicted data throughput for the UL radio link relative to a total predicted data throughput for all UL radio links. The initial MTPL of an UL radio link predicted to consume a higher proportion of the total predicted data throughput is adjusted (reduced) less than the initial MTPL of an UL radio link predicted to consume a lower proportion of the total predicted data throughput for the time period. The adjusted MTPL for each UL radio link can be also reduced when the UL radio link uses UL multiple input multiple output (MIMO) transmission via multiple antenna ports, e.g., by apportioning the adjusted MTPL among the multiple antenna ports of the UL radio link equally.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
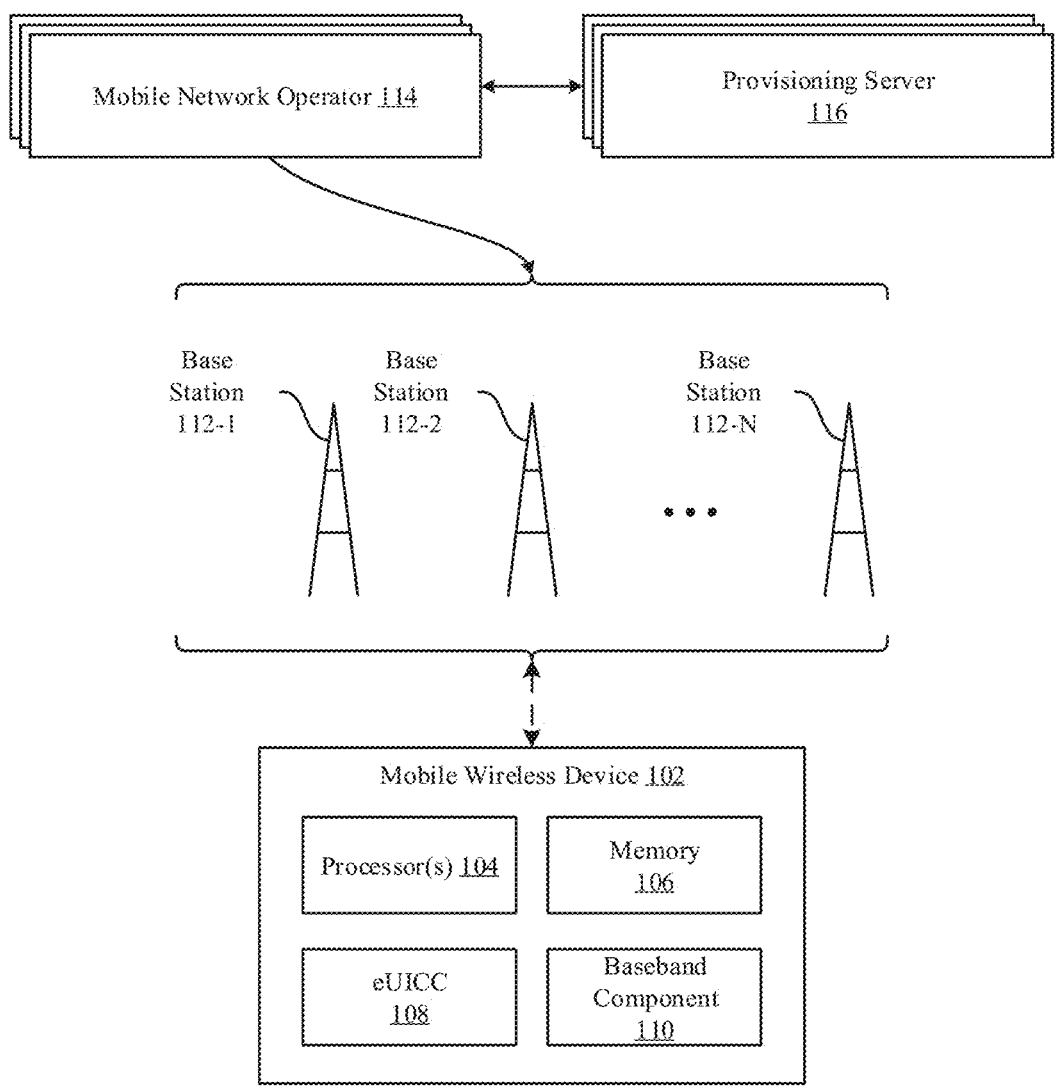
FIG. 1 illustrates a block diagram of different components of an exemplary system configured to implement cellular service provisioning to a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus to allocate uplink power dynamically across multiple parallel radio frequency links for wireless devices. A wireless device can connect to a cellular wireless network using multiple radio links for uplink transmission. In a 4G LTE cellular wireless network, a wireless device can connect using multiple radio links using uplink carrier aggregation (ULCA) to transport uplink (UL) data via multiple component carriers simultaneously. In a 5G standalone (SA) cellular wireless network, a wireless device can connect using multiple radio links via ULCA using multiple component carriers of a particular frequency band, e.g., within a Frequency Range 1 (FR1) band. In a 5G non-standalone (NSA) cellular wireless network, a wireless device can establish parallel radio links using two different radio access technologies (RATs), e.g., using one or more 5G new radio (NR) links to a 5G NR cell and one or more 4G LTE radio links to a 4G LTE cell, simultaneously.

Total uplink transmit power of the wireless device over all UL radio links is limited by hardware capabilities of the wireless device and required to satisfy radio frequency (RF) emission requirements, e.g., as set by the federal communications commission (FCC) in the United States or by similar regulatory bodies in other geographic regions. The total uplink transmit power can be averaged over an averaging time period and constrained to not exceed an average power level $P_{average}$ to limit human exposure to RF energy. In some cases, the wireless device can temporarily transmit above $P_{average}$, up to a maximum power level $P_{max}$ determined based on limitations of wireless circuitry hardware of the wireless device, during some portions of the averaging time period and return to lower transmit power levels, in some cases down to a fallback power level $P_{fallback}$, during other portions of the averaging time period to meet the regulatory requirements for the total UL transmit power level averaged over the averaging time period. The wireless device can estimate consumed transmit power of a transmit power budget during a current time period based on monitoring duty cycle usage for past time periods and predict a duty cycle usage for a future time period as a proxy to estimate future UL transmit power consumption. Setting an MTPL for each of multiple radio links independently can result in one or more radio links being subject to power limiting during an averaging time period to meet regulatory requirements based on power consumption of other radio links in use simultaneously. Reducing the MTPL for a given radio link may negatively impact performance when data traffic using the given radio link can prefer a more consistent (less variable) transmit power level throughout the averaging time period. As the multiple radio links share a common transmit power budget, limited by a total transmit power level averaged over the averaging time period, the MTPL for each radio link should be based on a fair allocation of transmit power among all the radio links proportional to their respective requirements.

To allocate transmit power among multiple radio links, the wireless device first determines an initial maximum transmit power level (MTPL) for each UL radio link, of multiple radio links used for UL traffic, independently based on a duty cycle prediction for the respective UL radio link. UL radio links having a lower duty cycle can be assigned a higher initial MTPL to allow for higher UL transmit power levels over a portion of the time period, as the lower duty cycle indicates the UL radio link does not require to transmit during the entire time period and should use less transmit power (or no transmit power) during another portion of the time period. UL radio links having a higher duty cycle can be assigned a lower initial MTPL to allow for transmitting during a greater portion of the time period (up to the entire time period) without exhausting a power budget. The wireless device can use an algorithmic calculation or a table lookup to map an estimated duty cycle for the time period to an MTPL value between a maximum MTPL value, which can depend on hardware wireless circuitry capability of the wireless device and minimum MTPL value, which can be at least a fallback power level $P_{fallback}$, or in some cases can be the previously discussed average power level $P_{average}$.

The initial MTPL for each UL radio link can be calculated independently. The wireless device must continue to meet a total UL transmit power limit during an averaging time period when the transmit power levels of all UL radio links that are transmitting simultaneously are summed together to form a total UL transmit power level. The initial MTPL for each UL radio link can be adjusted, e.g., reduced, proportionally based on the predicted data traffic (e.g., predicted throughput rate) for the UL radio link to form an adjusted MTPL. When the UL radio link is transmitted through multiple antenna ports, the adjusted MTPL can be additionally adjusted to account for dividing the transmit power among the multiple antenna ports, e.g., lower the adjusted MTPL inversely proportional to the number of antenna ports used by the UL radio link. The wireless device adjusts the initial MTPL to determine an adjusted MTPL for each UL radio link based on the predicted data throughput for the UL radio link relative to a total predicted data throughput for all UL radio links summed together. Initial MTPL values for UL radio links predicted to consume higher proportions of the total predicted data throughput are adjusted (reduced) less than initial MTPL values for UL radio links that are predicted to consume a lower proportion of the total predicted data throughput for the time period. In some embodiments, the adjustment of the initial MTPL of an UL radio link is proportional to the share of total predicted data throughput for the UL radio link. In some embodiments, an initial MTPL for an UL radio link is not adjusted for predicted data throughput (i.e., no reduction required based on predicted data throughput) when the proportion of total predicted data throughput for the UL radio link does not satisfy (e.g., does not exceed) an adjustment threshold value, e.g., 0.1 (ten percent). The MTPL for each UL radio link can be additionally reduced when the UL radio link uses UL multiple input multiple output (MIMO) transmission via multiple antenna ports, e.g., by apportioning the adjusted MTPL among the multiple antenna ports of an UL radio link equally. The adjustment of the initial MTPL to account for predicted data throughput of an UL radio link and multiple antenna ports can be performed as part of a single combined calculation step and implemented as the final MTPL for the antenna port at once.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram of different components of a system 100 that includes i) a mobile wireless device 102, which can also be referred to as a wireless device, a wireless communication device, a mobile device, a user equipment (UE), a device, and the like, ii) a group of base stations 112-1 to 112-N, which are managed by different Mobile Network Operators (MNOs) 114, and iii) a set of provisioning servers 116 that are in communication with the MNOs 114. The mobile wireless device 102 can represent a mobile computing device (e.g., an iPhone® or an iPad® by Apple®), the base stations 112-1 to 112-N can represent cellular wireless network entities including fourth generation (4G) Long Term Evolution (LTE) evolved NodeBs (eNodeBs or eNBs) and/or fifth generation (5G) NodeBs (gNodeBs or gNBs) that are configured to communicate with the mobile wireless device 102, and the MNOs 114 can represent different wireless service providers that provide specific services (e.g., voice and data) to which a user of the mobile wireless device 102 can subscribe to access the services via the mobile wireless device 102. Applications resident on the mobile wireless device 102 can advantageously access services using 4G LTE connections and/or 5G connections via the base stations 112. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the mobile wireless device 102.

Figure 2:
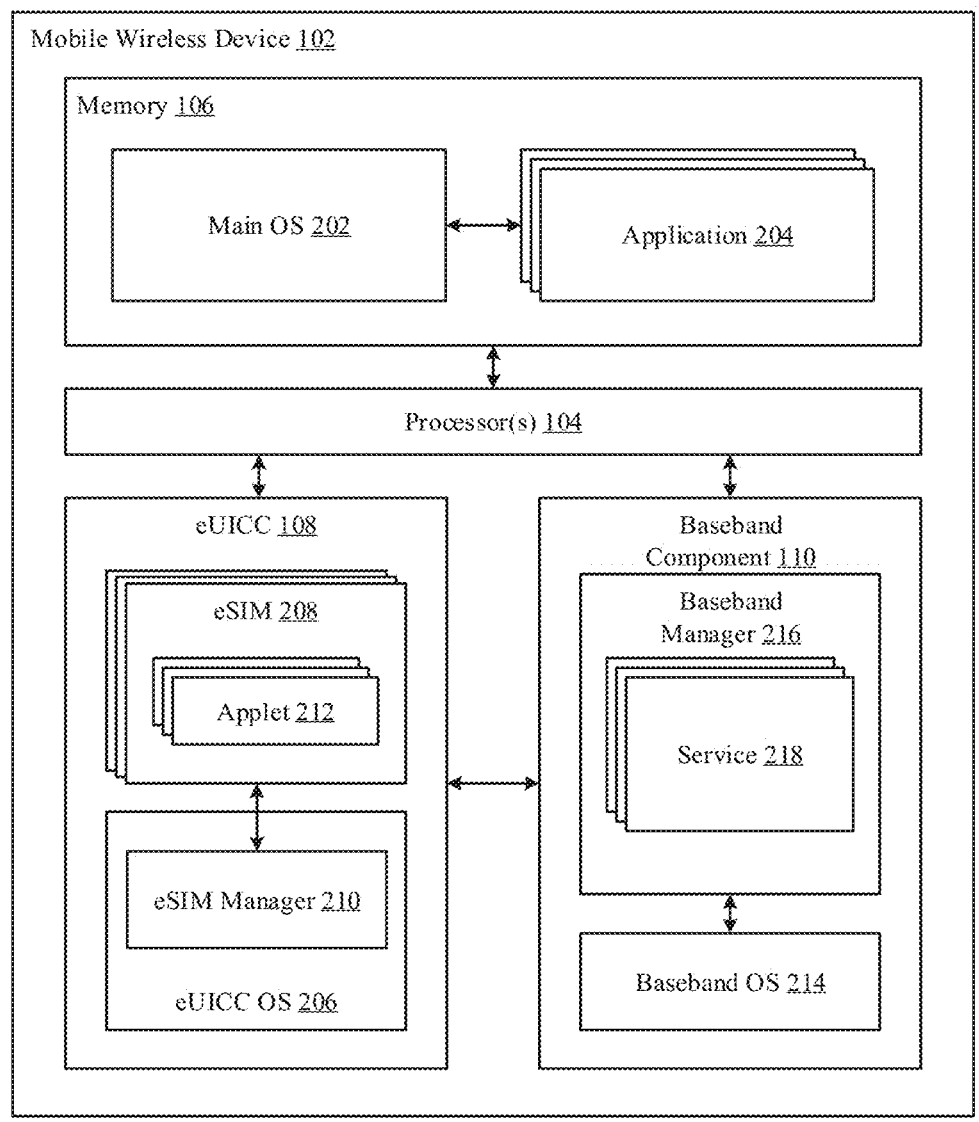
FIG. 2 illustrates a block diagram of a more detailed view of exemplary components of the system of FIG. 1, according to some embodiments.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth, latency, and/or data throughput requirements, and provide information to the communications control circuitry to determine suitable wireless connections for use by particular applications. The communications control circuitry can process information from the applications processing circuitry as well as from additional circuitry, such as the baseband component 110, to determine properties of requested and/or established cellular wireless connections. In some embodiments, the baseband component 110 determines transmit properties for uplink (UL) transmissions sent to a cellular wireless network and adjusts the UL transmissions to provide for proper reception at one or more receiving cells of the cellular wireless network. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
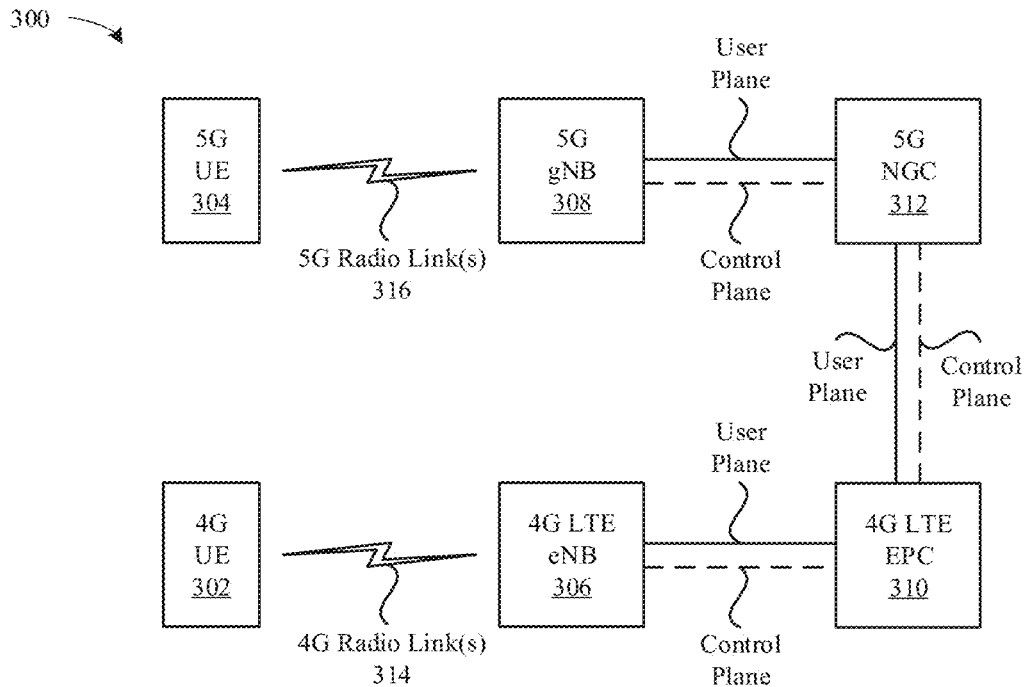
FIGS. 3A and 3B illustrate block diagrams of 5G non-standalone (NSA) and standalone (SA) network architectures, according to some embodiments.
Figure 3B:
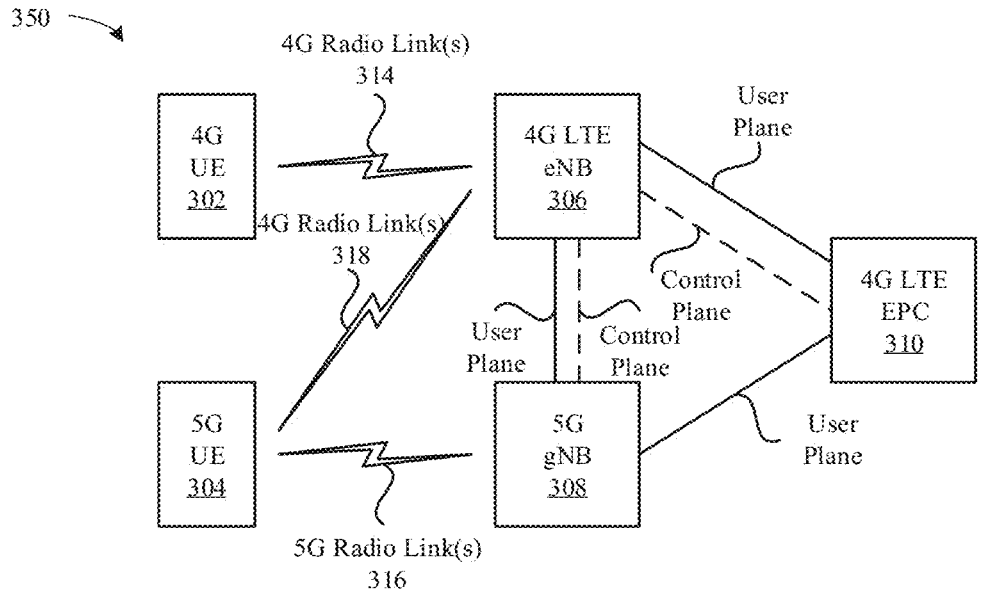

FIGS. 3A and 3B illustrate block diagrams 300, 350 of 5G standalone (SA) and non-standalone (NSA) network architectures respectively. Operating in a SA mode, as shown in FIG. 3A, a 5G user equipment (UE) 304 communicates with a cellular wireless network via one or more 5G radio links 316 to a 5G gNB (base station) 308, while a 4G UE 302 separately communicates with its own cellular wireless network via one or more 4G radio links 314 to a 4G LTE eNB 306. The 5G gNB 308 is connected to a 5G next generation core (NGC) network 312 including both a user plane connection for data transfer and a control plane connection for control signaling. Similarly, the 4G LTE eNB 306 is connected to a 4G LTE enhanced packet core (EPC) 310. The 4G LTE EPC 310 network can interwork with the 5G NGC 312 network via user plane and control connections between them. 5G SA networks that include both 5G access networks based on 5G gNBs 308 and a 5G NGC 312, however, are expected to take multiple years to build out, and as such a hybrid network that includes elements of both a 4G cellular wireless network and a 5G cellular wireless network is planned for 5G UEs 304 to operate in an NSA mode as illustrated by FIG. 3B. Operating in a NSA mode, a 5G UE 304 communicates with a cellular wireless network via both one or more 5G radio links 316 to a 5G gNB 308 and via one or more separate 4G radio links 318 to a 4G LTE eNB 306. The 4G LTE eNB 306 can be used for control plane signaling and act as a primary node for access network connection with the 5G UE 304, while the 5G gNB 308 can be used for user plane data transfer and act as a secondary node for access network connection with the 5G UE 304. The 5G gNB 308 can transfer user plane data to the 4G LTE EPC 310 when directly connected to the 4G LTE EPC 310 or when indirectly connected to the 4G LTE EPC 310 via the 4G LTE eNB 306, as indicated by the user plane connection between the 4G LTE eNB 306 and the 5G gNB 308. A 4G UE 302 (or a 5G UE 304 operating in a 4G LTE mode) can connect to the 4G LTE eNB 306 via the 4G radio link 314 for both control signaling and user plane data transfer.

The 4G UE 302 can communicate with the 4G LTE eNB 306 over one or more 4G radio links 314, which can terminate on one or more cells associated with the 4G LTE eNB 306. Communication using multiple UL radio links via a single radio access technology (RAT) can be referred to as uplink carrier aggregation (ULCA), where each UL radio link can be designated as an UL component carrier. UL component carriers can be contiguous or non-contiguous within a common frequency band, referred to as intra-band aggregation, or non-contiguous within different frequency bands, referred to as inter-band aggregation. Similarly, the 5G UE 304 can communicate with the 5G gNB 308 over one or more 5G radio link 316, which can terminate on one or more cells associated with the 5G gNB 308, where each 5G radio link can be designated as a 5G UL component carrier. The multiple 5G UL component carriers can be in a frequency range one (FR1) band. The 5G UE 304 can also communicate with the 4G LTE eNB 306 and the 5G gNB 308 in parallel using one or more 4G radio links 318 in parallel with one or more 5G radio links 316. Communication using parallel radio links over two different radio access technologies (RATs), e.g., 4G and 5G, can be referred to as E-UTRA NR dual connectivity (ENDC). The transmit power budget for UL transmissions can be shared across multiple UL radio links used simultaneously. Jointly determining how to allocate transmit power across the multiple UL radio links (rather than independently for each UL radio link) can provide more consistent and fairer data throughput for applications using the different UL radio links. Those applications that require higher data rate throughput and/or higher, regular duty cycle usage, such as live streaming, video connections, augmented reality streams, virtual reality streams, can be better accommodated by providing consistent power levels over averaging time periods rather than highly variable power levels that may impact performance. Connections that require lower data rates can also be protected from being allocated too little power to improve connectivity stability.

Figure 4A:
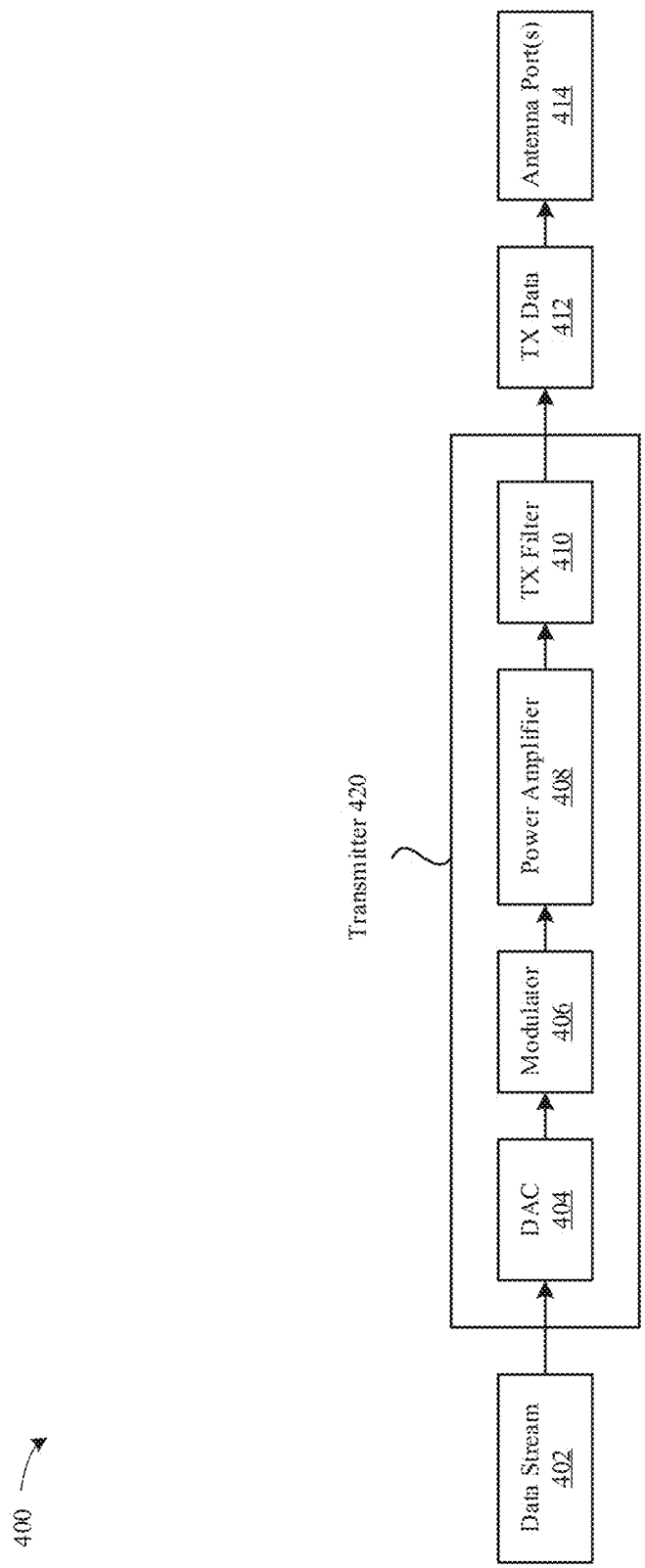
FIG. 4A illustrates an exemplary transmit chain of a wireless device, according to some embodiments.

FIG. 4A illustrates a diagram 400 of modules used for uplink transmission by a wireless device 102. A transmitter 420 can receive a digital data stream 402 for uplink data to be communicated wirelessly to a cellular wireless network through one or more antenna ports 414. A digital-to-analog converter (DAC) 404 of the transmitter 420 converts the digital data stream 402 into an analog signal which is modulated onto an uplink radio frequency (RF) carrier by a modulator 406 of the transmitter 420. The modulated analog signal is amplified by a power amplifier 408 and filtered through a suitable transmit (TX) filter 410 resulting in an amplified analog transmit data signal 412 that is transmitted wirelessly over one or more radio links to a cellular wireless network via one or more antenna ports 414. When multiple antenna ports 414 are used, the UL transmission can be referred to as a multiple input multiple output (MIMO) transmission, and can be used to improve data throughput and/or transmission reliability. The UL transmission output from the antenna ports 414 of the wireless device 102 are transmitted at a power level to allow for proper reception by cells of the cellular wireless network. The UL transmissions are limited by the wireless circuitry of the transmitter 420 and the transmission properties of the antenna ports 414. The UL transmissions from all antenna ports 414 of the wireless device 102 are required to meet regulatory requirements, such as a specific absorption rate (SAR) limit for human exposure to radio frequency (RF) energy. A maximum transmit power limit (MTPL) can be determined and adjusted by the wireless device 102 for transmission via each radio link used for UL transmission. An initial MTPL can be determined separately for each radio link based on a recent history of the radio link's power consumption, e.g., using measurements of duty cycles (transmit on/off time intervals) over one or more past time periods as a proxy for power consumption by the radio link. The initial MTPL values for the radio links, can be then adjusted downward (as the total transmission power budget must be shared among all radio links used in parallel) based on predicted data throughput requirements for each radio link and then divided among multiple antenna ports used by respective radio links.

Figure 4B:
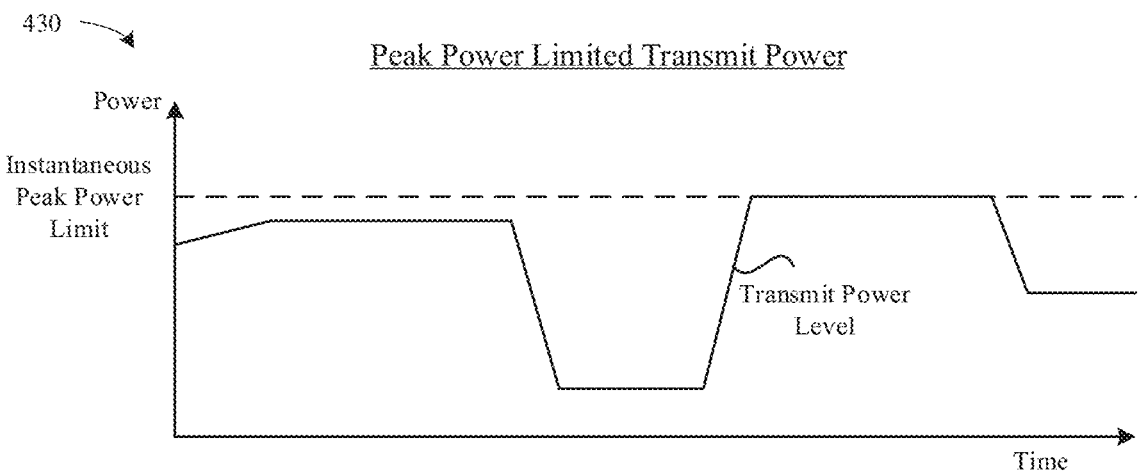
FIGS. 4B and 4C illustrate examples of transmission power limiting for a wireless device, according to some embodiments.

FIG. 4B illustrates a diagram 430 of a transmitter 420 that limits a peak transmit power level to remain below an instantaneous peak power limit, which can be determined based on regulatory requirements for human exposure. By staying at or below the instantaneous peak power limit continuously at all times, the transmitter 420 of the wireless device 102 can satisfy the regulatory requirements; however, this form of peak power limited transmissions can be suboptimal when temporary higher levels of transmit power can be required for increased data throughput.

Figure 4C:
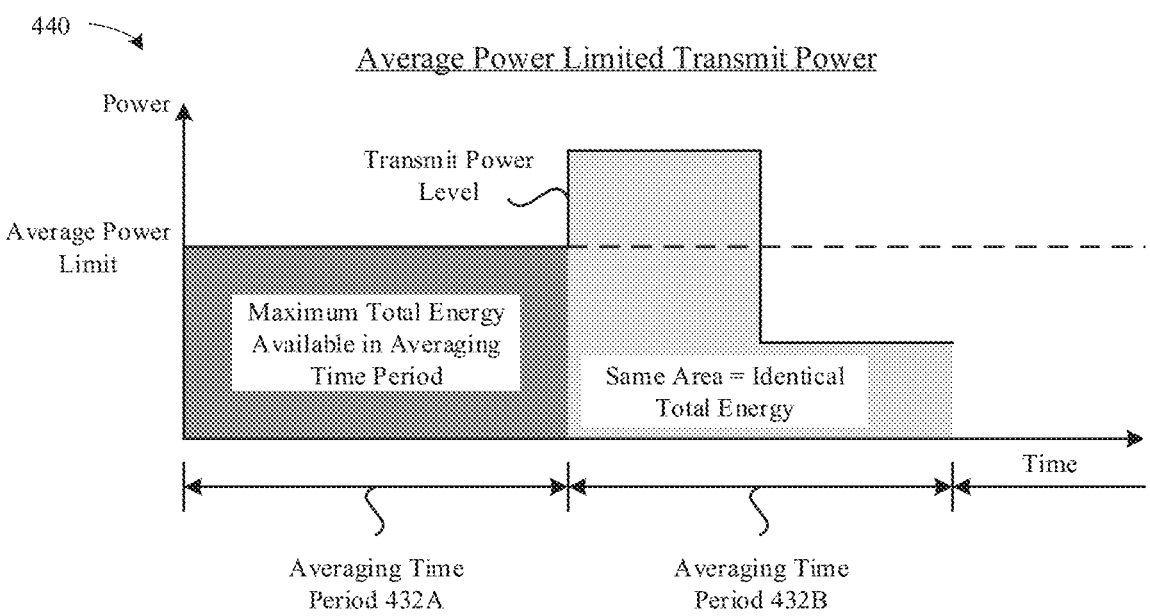

FIG. 4C illustrates a diagram 440 of a transmitter 420 that limits an average transmit power level to meet an average power limit during successive averaging time periods 432A, 432B. Transmitting at (or just below) the average power limit for the entire averaging time period 432A can allow the transmitter 420 of the wireless device 102 to use a maximum available of total energy during the averaging time period 432A. With average power limited transmission that allows for temporarily transmitting at a power level above the average power limit and then transmitting at a power level below the average power limit during the same averaging time period 432B, the transmitter 420 of the wireless device 102 can concentrate transmit power to shorter time periods that may improve uplink data throughput during the shorter time periods. In some cases, an application can require transmit power continuously, which favors transmission as shown for the averaging time period 432A, while another application can require transmit power intermittently, which can favor transmission as shown for the averaging time period 432B. As long as the total energy consumed by the transmitter 420 during an averaging time period equals or falls below the maximum total energy available for an averaging time period, the average power limit for UL transmission can be satisfied. In an exemplary transmission scheme, the wireless device 102 transmits at a maximum transmit power level ($P_{max}$), which can be determined by a number of factors, such as a radio access technology (RAT) used, e.g., 4G LTE or 5G NR, and hardware wireless circuitry capabilities of the transmitter 420 of the wireless device 102, for a portion of an averaging time period and transmits at a fallback power level ($P_{fallback}$) for a remainder of the averaging time period to ensure that an average power limit ($P_{average}$) is satisfied when averaging over the entire time period. In representative implementations, a $P_{fallback}$ value can be configured based on a $P_{average}$ value, e.g., $P_{fallback} = P_{average} - 3$ dB. For UL data traffic that occurs in bursts, a non-uniform transmit power level over an averaging time period can improve throughput and provide for better UL coverage that a uniform transmit power level over the averaging time period, as the wireless device 102 can concentrate UL transmit power during active portions of a duty cycle and use inactive portions of the duty cycle to lower the averaged power level over the averaging time period. A higher maximum transmit power level (MTPL) value can be used for UL transmissions with lower valued duty cycles, e.g., below a low duty cycle threshold, while a lower MTPL value can be used for UL transmissions with higher valued duty cycles, e.g., above a high duty cycle threshold. The wireless device 102 can also monitor consumed power during an averaging time period and dynamically adjust the MTPL values used for various radio links to ensure the transmit power level averaged over the averaging time period meets regulatory requirements.

Figure 4D:
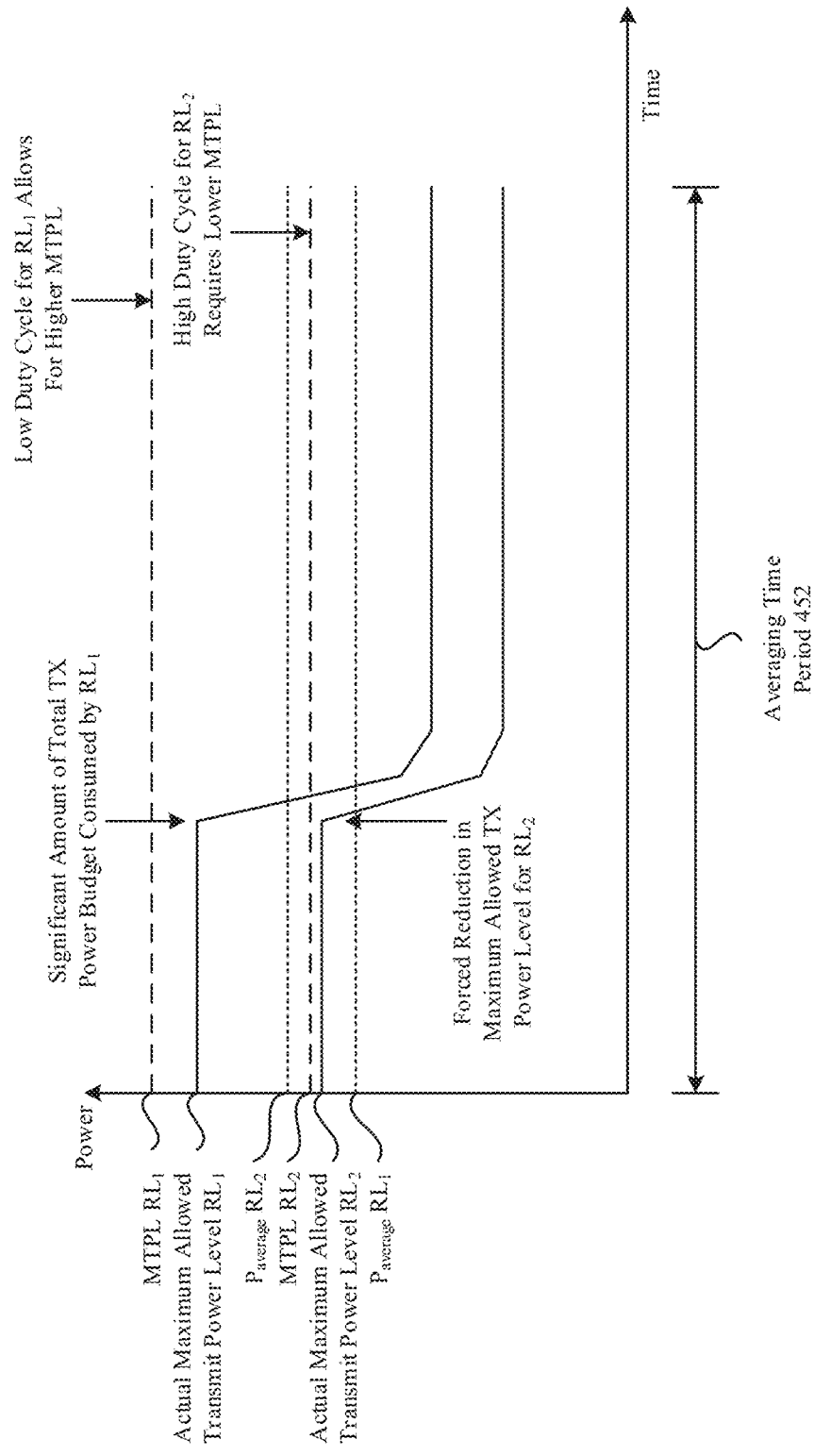
FIG. 4D illustrates an example of a combined transmit power limitation with multiple radio links used for transmission by a wireless device, according to some embodiments.

FIG. 4D illustrates a diagram 450 of an example of a combined UL transmit power limitation impacting transmission via multiple UL radio links. As discussed herein, an MTPL value for each UL radio link configured by a wireless device 102 can be dynamically determined and adjusted during an averaging time period 452. In the example shown, the MTPL values for each UL radio link is not adjusted and only an initial MTPL value determined for the averaging time period 452 is illustrated. The UL transmit power levels allowed for each UL radio link can be impacted by requirements to satisfy regulatory limits for human exposure to RF energy for the combined UL transmit power levels for all UL radio links used simultaneously by the wireless device 102. In the example illustrated in FIG. 4C, initial MTPL values are determined for each of two UL radio links that may use different radio access technologies (RATs), a first UL radio link ($RL_1$) using a first RAT, and a second UL radio link ($RL_2$) using a second RAT. In the example shown, an application using $RL_1$ is predicted to transmit with a low duty cycle, and therefore the initial MTPL for $RL_1$ allows for a higher transmit power level (for a shorter period of time during the averaging time period 452); while an application using $RL_2$ is predicted to transmit with a high duty cycle, and therefore the initial MTPL for $RL_2$ permits only a lower transmit power level (for a longer period of time during the averaging time period 452). The initial MTPL for each radio link, $RL_1$ and $RL_2$, are determined independently based on the predicted duty cycle for the respective radio links. An average power limit for each radio link $P_{average}$ can be determined based on requirements to satisfy regulatory requirements for the respective RAT used. The MTPL for the first radio link $RL_1$ is set to a higher level than $P_{average}$ for $RL_1$, because the low duty cycle for $RL_1$ (in this example 20% duty cycle) indicates that $RL_1$ will transmit for only a relatively small portion of the averaging time period 452. The MTPL for the second radio link $RL_2$ is set to a level just below $P_{average}$ for $RL_2$, because the high duty cycle for $RL_2$ (in this example 100% duty cycle) indicates that $RL_2$ will transmit for the entire averaging time period 452. In this example, the MTPL values for each radio link are not adjusted to account for a combined total transmit power level using both radio links simultaneously to meet regulatory requirements. The actual maximum transmit power level permitted for each radio link is subsequently set by a mechanism that accounts for total UL transmit power levels through all radio links combined. In this case, the actual maximum transmit power levels permitted for each radio link is less than the MTPL values. In addition, the wireless device 102 monitors consumption of power during the averaging time period 452 to ensure transmit power levels for both radio links combined together meet regulatory requirements for human exposure to RF energy averaged over averaging time period 452. In the example of FIG. 4C, the first radio link $RL_1$ transmits at a higher power level than the second radio link $RL_2$ and consumes a significant amount of the total transmit power budget available for both radio links during the first portion of the averaging time period 452. The wireless device 102 further limits the maximum transmit power levels for each of the radio links to lower levels, which forces a reduction in the allowed maximum transmit power level of the second radio link $RL_2$ because of the high amount of power consumption of the combined transmit power budget by the first radio link $RL_1$. This power reduction can negatively impact performance for transmission via the second radio link $RL_2$, when an application using $RL_2$ uses a high duty cycle (e.g., expects to transmit over most/all of the averaging time period 452) and is prematurely limited to lower transmit power levels during a significant portion of the averaging time period 452 due to the first radio link $RL_1$. To overcome this limitation, as discussed herein, the MTPL for each of the radio links can be adjusted according to data throughput requirements for all of the radio links considered together.

Figure 5:
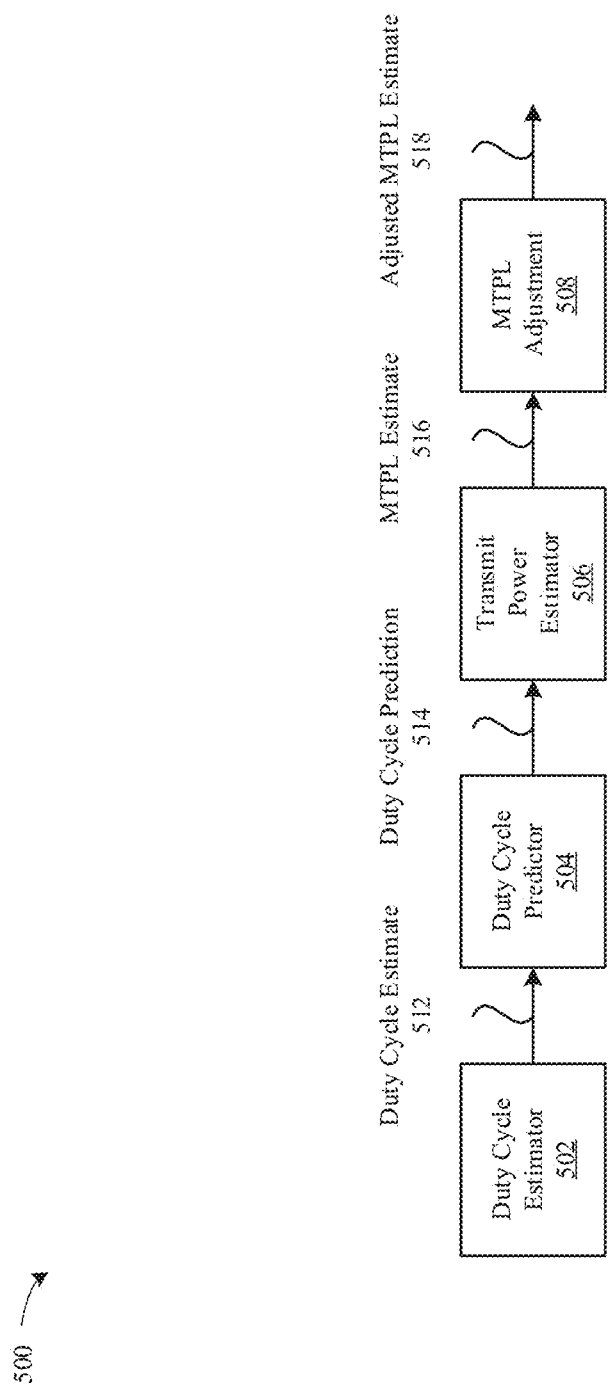
FIG. 5 illustrates a diagram of exemplary modules used to dynamically determine and adjust a maximum transmit power limit (MTPL) for transmissions by a wireless device using multiple uplink radio links, according to some embodiments.

FIG. 5 illustrates a diagram 500 of exemplary modules used to determine an initial MTPL value and subsequently an adjusted MTPL value for UL radio links of a wireless device 102. The exemplary modules include a duty cycle estimator 502, a duty cycle predictor 504, a transmit power estimator 506, and an MTPL adjustment module 508, each of which may implemented in whole or in part as software, firmware, and/or hardware modules in the wireless device 102. In some embodiments, the modules may be stored as instructions in a memory of the wireless device 102 and implement functions to configure the wireless device 102 to dynamically determine and adjust MTPL values for UL radio links upon execution of the instructions by one or more processors of the wireless device 102.

For a given radio link, a duty cycle estimator 502 estimates a duty cycle used by one or more applications during one or more past time periods to communicate UL data via the radio link. In some embodiments, the duty cycle estimator 502 estimates duty cycles for each of one or more applications that communicated data previously (in the past) using the radio link and combines the duty cycle estimates for the applications to determine a joint duty cycle estimate for all applications using the radio link for one or more past time periods. The estimate of the duty cycle provides a metric for past transmit power usage of the radio link. The duty cycle estimator 502 outputs a duty cycle estimate 512, which is input to a duty cycle predictor 504.

For the given radio link, the duty cycle predictor 504 predicts a duty cycle for usage of the radio link during a present or future time period (e.g., a next available time period for transmission) based on one or more duty cycle estimates 512 from past usage of the radio link by the one or more applications. The duty cycle predictor 504 can use various algorithms including averaging, weighted averaging, weighted moving averaging, predictive drift, autoregressive integrated moving averaging, pattern recognition, machine learning, and the like. In some embodiments, the duty cycle predictor 504 predicts an amount of active time in a next time period $T_i$ based on a weighted moving average of past observations of active time in previous time periods, e.g, $T_{i-1}$, $T_{i-2}$, etc. In some embodiments, the duty cycle predictor 504 calculates duty cycles, e.g., based on estimated active time of an application (or multiple applications), according to Equation (1)

$$\text{Est}_{active,i} = (1-\alpha) \times \text{Est}_{active,i-1} + \alpha \times \text{active}_{i-1} \quad (1)$$

where $\text{Est}_{active,i}$ is the predicted estimate for the active time for the application(s) for the time period $T_i$ based on the previously determined active time estimate $\text{Est}_{active,i-1}$ for the application(s) for the time period $T_{i-1}$ combined with the observed actual amount of active time for the application(s) for the time period $T_{i-1}$ weighted by the factor α, which can be a constant value between 0 and 1, e.g., ⅛. The duty cycle prediction 514 output by the duty cycle predictor 504 to the transmit power estimator 506 can be represented as a percentage value between 0 and 100 or as a number between 0 and 1. The duty cycle prediction 514 represents a fractional amount of time that the application(s) are predicted to be actively transmitting data (and therefore consuming power) during the time period $T_i$. In some embodiments, the duty cycle predictor 504 uses a drift method to estimate an average amount of change (drift) for the active portion of a time period and predicts an active time for the next time period based on the drift and the predicted duty cycle (active time) for the previous time period. In some embodiments, the duty cycle predictor 504 uses an autoregressive moving average (ARIMA) algorithm that combines a differenced autoregressive model with a moving average model.

The transmit power estimator 506 estimates a maximum transmit power level (MTPL) value for each radio link based on the duty cycle prediction 514 provided by the duty cycle predictor 504 for the radio link. In some embodiments, the transmit power estimator 506 maps the duty cycle prediction 514 to an MTPL estimate 516 using lookup table or calculates the MTPL estimate 516 based on a functional algorithm. In some embodiments, the MTPL estimate 516 is determined between a minimum transmit power level $P_{min}$ and a maximum transmit power level $P_{max}$. The minimum transmit power level $P_{min}$ can vary based on an application type for an application that transmits UL data via the radio link. In some embodiments, for a voice application, $P_{min}$ is set to be at least $P_{average}$ to ensure that the transmit power level for the voice application does not fall below $P_{average}$, where $P_{average}$ represents a maximum average transmit power limit that can depend on a radio access technology in use, e.g., 4G LTE or 5G NR, a radio frequency band in use, an antenna port used, and/or a position of the wireless device 102 relative to a user, e.g., near the head, away from the head, adjacent to the body, separated from the body, etc. In some embodiments, the transmit power estimator 506 determines the MTPL estimate 516 based on a cumulative amount of power consumed for the radio link during an averaging time period. For example, $P_{average}$ can be determined dynamically during an averaging time period based on an amount of residual (unconsumed) transmit power available for the remaining time in an averaging time period from a total power budget allocated for the averaging time period. In some embodiments, for a data application, $P_{min}$ is set to be up to 3 dB (or another applicable reduction amount) lower than $P_{max}$. In some embodiments, $P_{min}$ is at least for any application type, where $P_{fallback}$ is a fallback transmit level estimated to be required to maintain a reliable communication link with the cellular wireless network. In some embodiments, $P_{fallback}$ is set to be up to 3 dB (or another application reduction amount) lower than $P_{average}$. In some embodiments, for data applications, the minimum transmit power level $P_{min}$ is set to whichever of two values is higher, $P_{average}$ or $P_{max}-3$ dB (or another applicable reduction amount).

In some embodiments, the unadjusted MTPL estimate 516 for a radio link output by the transmit power estimator 506 is set to equal a maximum permissible transmit power level $P_{max}$ when the duty cycle prediction 514 does not satisfy a low duty cycle threshold, e.g., falls below the low duty cycle threshold. Exemplary applications that use a lower duty cycle value can include a voice application, such as a Voice over Internet Protocol (VoIP) application or a Voice over LTE (VoLTE) application. Exemplary low duty cycle threshold values can include 0.2, 0.3, 0.4, 0.5, etc. In some embodiments, the unadjusted MTPL estimate 516 for a radio link output by the transmit power estimator 506 is set to $P_{max}-3$ dB (or another applicable reduction amount) when the duty cycle prediction 514 satisfies (e.g., equals or exceeds) a low duty cycle threshold and does not satisfy (e.g., falls below) a high duty cycle threshold, e.g., is in a medium (above low, below high) duty cycle range. In some embodiments, the reduction amount applied to the unadjusted MTPL estimate 516 for the radio link is determined by the transmit power estimator 506 based on the duty cycle prediction 514 for the radio link. In some embodiments, the unadjusted MTPL estimate 516 for the radio link output by the transmit power estimator 506 is set to the minimum transmit power level $P_{min}$ when the duty cycle prediction 514 satisfies (e.g., equals or exceeds) a high duty cycle threshold. Exemplary high duty cycle threshold values can include 0.8, 0.9, 1.0, etc.

When there are multiple UL radio links used to transmit UL data for applications simultaneously, the MTPL estimates 516 for each of the UL radio links can be adjusted by an MTPL adjustment module 508 to determine an adjusted MTPL estimate 518 for the respective UL radio links, as the UL transmit power budget must be shared among all of the UL radio links. In addition, when an UL radio link uses multiple antenna ports to transmit an UL data stream, the adjusted MTPL estimate 518 provided by the MTPL adjustment module 508 can account for the number of antenna ports used simultaneously by the respective UL radio link. For each UL radio link, the MTPL adjustment module 508 applies an MTPL adjustment (reduction) weighted according to the required UL transmit power for the UL radio link, e.g., based on a data throughput (traffic) requirement for the UL radio link, relative to the total UL transmit power required for all UL radio links that are transmitting at the same time, e.g., based on the data throughput (traffic) requirement for all of the UL radio links summed together. In addition to a reduction of the MTPL based on the data throughput weighting, the MTPL adjustment module 508 can also reduce the MTPL estimate 516 based on the number of antenna ports used by the UL radio link. Thus, the adjusted MTPL estimate 518 can be calculated from the MTPL estimate 516 reduced by an uplink carrier aggregation (ULCA) adjustment factor (or more generally, a UL multiple radio link adjustment factor) and additionally reduced by a multiple-input multiple-output (MIMO) adjustment factor (to account for multiple antenna ports) in accordance with Equation (2), where the MTPL values are represented logarithmically (in dB or dBm). In particular, the adjusted MTPL value for the $j^{th}$ antenna port of the $i^{th}$ UL radio link $MTPL_{i,j,adj}=MTPL_i+ULCA$ (UL multiple radio link) adjustment+MIMO adjustment. The ULCA (UL multiple radio link) and MIMO adjustments will be negative values (reductions) or a zero value.

$$MTPL_{i,j,adj} = MTPL_i + 10 \times \log_{10}\left(\frac{TH_i}{\Sigma_i TH_i}\right) + 10 \times \log_{10}\left(\frac{1}{|TX_i|}\right) \quad (2)$$

The ULCA (UL multiple radio link) adjustment factor for the $i^{th}$ UL radio link is based on an estimate of the UL transmit power required for the $i^{th}$ UL radio link relative to the UL transmit power required for all of the UL radio links. The required UL transmit power for the $i^{th}$ UL radio link is modeled based on an estimated data throughput $TH_i$ for the $i^{th}$ UL radio link. The MIMO adjustment factor for the $j^{th}$ antenna port of the $i^{th}$ UL radio link is based on the number of antenna ports $|TX_i|$ used by the $i^{th}$ UL radio link. The MIMO adjustment factor illustrated in Equation (2) divides the MTPL among the antenna ports of a given UL radio link equally. In some embodiments, the ULCA (UL multiple radio link) adjustment factor is applied to an UL radio link carrier only when the relative data throughput contribution for the UL radio link, i.e., $$\left(\frac{TH_i}{\Sigma_i TH_i}\right),$$

satisfies, e.g., equals or exceeds, a data throughput threshold value, e.g., 0.1, which corresponds to a 10 dB reduction. The data throughput threshold value can be configurable by the wireless device 102. The requirement for the data throughput threshold value effectively limits the maximum amount of reduction allowed for the ULCA (UL multiple radio link) adjustment factor. The MIMO adjustment factor, however, can always be applied, as the UL transmit power can be equally distributed among the antenna ports of the UL radio link.

The MTPL adjustment module 508 can produce an adjusted MTPL estimate 518 for each antenna port of each UL radio link used by the wireless device 102. The adjusted MTPL estimate 518 accounts for a shared transmit power budget among all UL radio links used by the transmitter 420 of the wireless device 102 and apportions the transmit power budget using the adjusted MTPL estimates 518 based on relative throughput contributions required for each UL radio link relative to the total throughput. Those UL radio links that are expected to require more UL transmit power because of a higher proportion of the UL data throughput are reduced less by the ULCA (UL multiple radio link) adjustment factors than the UL radio links with the lower relative data throughputs. The ULCA (UL multiple radio link) adjustment factor favors UL radio links with higher data throughput requirements (and therefore higher UL transmit power requirements). The MIMO adjustment factor divides the MTPL equally among all antenna ports of a given UL radio link. In some embodiments, the MTPL for each antenna port of a given UL radio link can be divided unequally based on an estimated data throughput contribution expected via the antenna port. For example, an antenna port that is blocked or for which transmissions are otherwise interfered with may be allocated a lower amount of MTPL (reduced more) than an antenna port that is able to freely transmit. Using adjusted MTPL estimates 518 can provide improved performance, as the total transmit power budget can be more fairly distributed among the UL radio links during an averaging time period and forestall one or more UL radio links consuming too much of the transmit power budget during a first portion of the averaging time period and leaving too little transmit power available in a second portion of the averaging time period.

Figure 6:
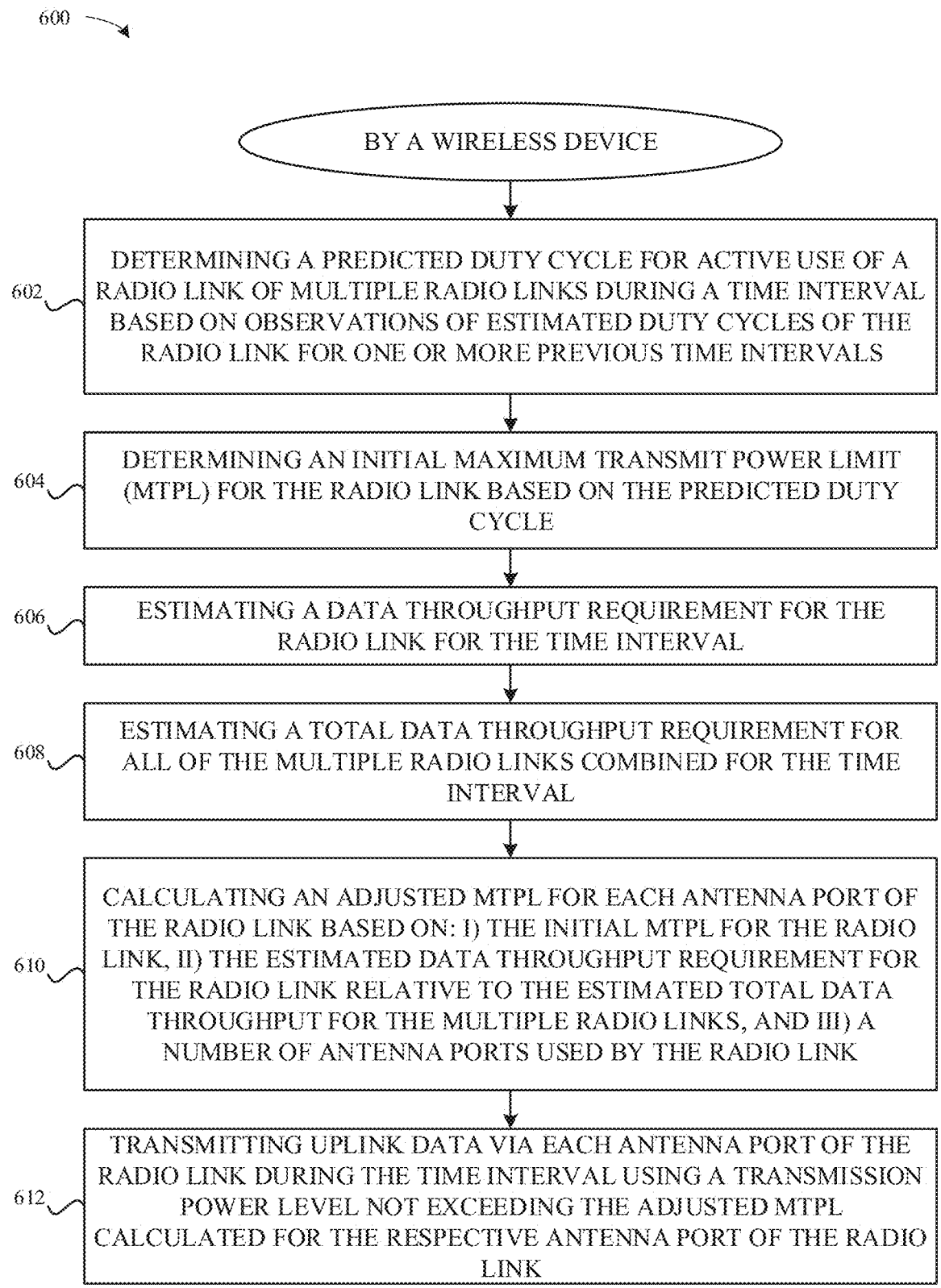
FIG. 6 illustrates a flowchart of an exemplary method performed by a wireless device to dynamically allocate an uplink transmit power budget across multiple radio links, according to some embodiments.

FIG. 6 illustrates a flowchart 600 of an exemplary method for dynamically allocating an uplink (UL) transmit power budget across multiple radio links for a wireless device 102. For each radio link of multiple radio links used for UL transmission by the wireless device 102, the wireless device 102 performs the following actions. At 602, the wireless device 102 determines a predicted duty cycle for active use of a radio link during a time interval based on observations of estimated duty cycles of the radio link for one or more previous time intervals. At 604, the wireless device 102 determines an initial maximum transmit power limit (MTPL) for the radio link based on the predicted duty cycle. At 606, the wireless device 102 estimates a data throughput requirement for the radio link for the time interval. At 608, the wireless device 102 estimates a total data throughput requirement for all of the multiple radio links combined for the time interval. At 610, the wireless device 102 calculates an adjusted MTPL for each antenna port of the radio link based on: i) the initial MTPL for the radio link, ii) the estimated data throughput requirement for the radio link relative to the estimated total data throughput for the multiple radio links, and iii) a number of antenna ports used by the radio link. At 612, the wireless device 102 transmits UL data via each antenna port of the radio link during the time interval using a transmission power level not exceeding the adjusted MTPL calculated for the respective antenna port of the radio link.

In some embodiments, the adjusted MTPL for each antenna port of a given radio link is identical. In some embodiments, the initial MTPL for a given radio link is selected, based on the predicted duty cycle, between a minimum MTPL, used for duty cycles at or above a high duty cycle threshold, and a maximum MTPL, used for duty cycles at or below a low duty cycle threshold. In some embodiments, the initial MTPL for a given radio link is selected based on the predicted duty cycle and an UL traffic type for UL data transmitted via the given radio link. In some embodiments, the initial MTPL is at least a maximum average power limit allowed for a radio access technology and a radio frequency band to comply with a regulatory human exposure requirement when the UL traffic type comprises a voice connection. In some embodiments, the wireless device 102 calculates for each radio link, an adjusted MTPL for the radio link by reducing the initial MTPL for the radio link based on a ratio of the estimated data throughput for the radio link to a sum of the estimated data throughputs for all radio links. In some embodiments, the wireless device 102 distributes the adjusted MTPL for the radio link equally among antenna ports used by the radio link. In some embodiments, the adjusted MTPL for the radio link equals the initial MTPL for the radio link when the ratio of the estimated data throughput for the radio link to the sum of the estimated data throughputs for all radio links does not satisfy a configurable throughput ratio threshold. In some embodiments, the wireless device 102 restricts a total transmission power level via all radio links averaged over the time interval to not exceed a regulatory requirement for radio frequency human exposure.

Representative Exemplary Apparatus

Figure 7:
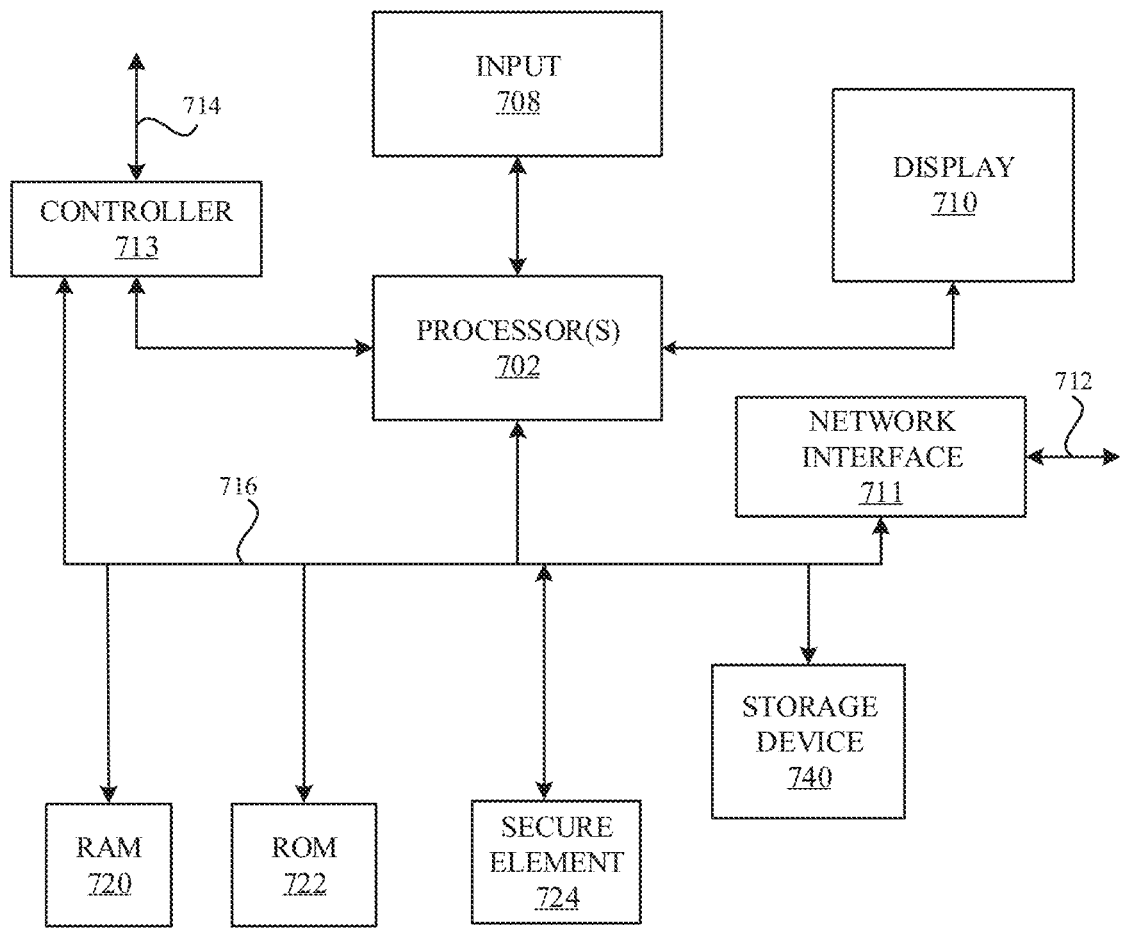
FIG. 7 illustrates a block diagram of exemplary elements of a mobile wireless device, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the mobile wireless device 102. As shown in FIG. 7, the computing device 700 can include one or more processors 702 that represent microprocessors or controllers for controlling the overall operation of computing device 700. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. In some embodiments, the computing device 700 can include a display 710 (screen display) that can be controlled by the processor(s) 702 to display information to the user (for example, information relating to incoming, outgoing, or active communication sessions). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor. The computing device 700 can also include a secure element 724. The secure element 724 can include an eUICC 108.

The computing device 700 also includes a storage device 740, which can include a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a;

IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when 5G, LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamically allocating an uplink (UL) transmit power budget across multiple radio links for a wireless device, the method comprising:
by the wireless device, for each radio link of the multiple radio links:
determining a predicted duty cycle for active use of the radio link during a time interval based on observations of estimated duty cycles of the radio link for one or more previous time intervals;
determining an initial maximum transmit power limit (MTPL) for the radio link based on the predicted duty cycle;
estimating a data throughput requirement for the radio link for the time interval;
estimating a total data throughput requirement for all of the multiple radio links combined for the time interval;
calculating an adjusted MTPL for each antenna port of the radio link based on:
the initial MTPL for the radio link;
the estimated data throughput requirement for the radio link relative to the estimated total data throughput for the multiple radio links, and
a number of antenna ports used by the radio link; and
transmitting UL data via each antenna port of the radio link during the time interval using a transmission power level not exceeding the adjusted MTPL calculated for the respective antenna port of the radio link.

2. The method of claim 1, wherein the adjusted MTPL for each antenna port of a given radio link is identical.

3. The method of claim 1, wherein the initial MTPL for a given radio link is selected, based on the predicted duty cycle, between a minimum MTPL, used for duty cycles at or above a high duty cycle threshold, and a maximum MTPL, used for duty cycles at or below a low duty cycle threshold.

4. The method of claim 1, wherein the initial MTPL for a given radio link is selected based on the predicted duty cycle and an UL traffic type for UL data transmitted via the given radio link.

5. The method of claim 4, wherein the initial MTPL is at least a maximum average power limit allowed for a radio access technology and a radio frequency band to comply with a regulatory human exposure requirement when the UL traffic type comprises a voice connection.

6. The method of claim 1, further comprising:
calculating, for each radio link, an adjusted MTPL for the radio link by reducing the initial MTPL for the radio link based on a ratio of the estimated data throughput for the radio link to a sum of the estimated data throughputs for all radio links.

7. The method of claim 6, wherein the wireless device distributes the adjusted MTPL for the radio link equally among antenna ports used by the radio link.

8. The method of claim 6, wherein the adjusted MTPL for the radio link equals the initial MTPL for the radio link when the ratio of the estimated data throughput for the radio link to the sum of the estimated data throughputs for all radio links does not satisfy a configurable throughput ratio threshold.

9. The method of claim 1, further comprising:
by the wireless device:
restricting a total transmission power level via all radio links averaged over the time interval to not exceed a regulatory requirement for radio frequency human exposure.

10. A wireless device comprising:
wireless circuitry comprising a plurality of antenna ports;
at least one processor communicatively coupled to the wireless circuitry and to a memory storing instructions that, when executed by the at least one processor, configures the wireless device to dynamically allocate an uplink (UL) transmit power budget across multiple radio links by at least:
for each radio link of the multiple radio links:

determining a predicted duty cycle for active use of the radio link during a time interval based on observations of estimated duty cycles of the radio link for one or more previous time intervals;

determining an initial maximum transmit power limit (MTPL) for the radio link based on the predicted duty cycle;

estimating a data throughput requirement for the radio link for the time interval;

estimating a total data throughput requirement for all of the multiple radio links for the time interval;

calculating an adjusted MTPL for each antenna port of the radio link based on:
  the initial MTPL for the radio link;
  the estimated data throughput requirement for the radio link relative to the estimated total data throughput for the multiple radio links, and
  a number of antenna ports used by the radio link; and transmitting UL data via each antenna port of the radio link during the time interval using a transmission power level not exceeding the adjusted MTPL calculated for the respective antenna port of the radio link.

11. The wireless device of claim 10, wherein the wireless device is further configured to restrict a total transmission power level via all radio links averaged over the time interval to not exceed a regulatory requirement for radio frequency human exposure.

12. The wireless device of claim 10, wherein the adjusted MTPL for each antenna port of a given radio link is identical.

13. The wireless device of claim 10, wherein the initial MTPL for a given radio link is selected, based on the predicted duty cycle, between a minimum MTPL, used for duty cycles at or above a high duty cycle threshold, and a maximum MTPL, used for duty cycles at or below a low duty cycle threshold.

14. The wireless device of claim 10, wherein the initial MTPL for a given radio link is selected based on the predicted duty cycle and an UL traffic type for UL data transmitted via the given radio link.

15. The wireless device of claim 14, wherein the initial MTPL is at least a maximum average power limit allowed for a radio access technology and a radio frequency band to comply with a regulatory human exposure requirement when the UL traffic type comprises a voice connection.

16. The wireless device of claim 10, wherein the wireless device is further configured to:

calculate, for each radio link, an adjusted MTPL for the radio link by reducing the initial MTPL for the radio link based on a ratio of the estimated data throughput for the radio link to a sum of the estimated data throughputs for all radio links.

17. The wireless device of claim 16, wherein the wireless device distributes the adjusted MTPL for the radio link equally among antenna ports used by the radio link.

18. The wireless device of claim 16, wherein the adjusted MTPL for the radio link equals the initial MTPL for the radio link when the ratio of the estimated data throughput for the radio link to the sum of the estimated data throughputs for all radio links does not satisfy a configurable throughput ratio threshold.

19. A non-transitory computer-readable medium storing instructions that, when executed on at least one processor of a wireless device, configure the wireless device to dynamically allocate an uplink (UL) transmit power budget across multiple radio links by at least:

for each radio link of the multiple radio links:
  determining a predicted duty cycle for active use of the radio link during a time interval based on observations of estimated duty cycles of the radio link for one or more previous time intervals;
  determining an initial maximum transmit power limit (MTPL) for the radio link based on the predicted duty cycle;
  estimating a data throughput requirement for the radio link for the time interval;
  estimating a total data throughput requirement for all of the multiple radio links for the time interval;
  calculating an adjusted MTPL for each antenna port of the radio link based on:
    the initial MTPL for the radio link;
    the estimated data throughput requirement for the radio link relative to the estimated total data throughput for the multiple radio links, and
    a number of antenna ports used by the radio link; and
  transmitting UL data via each antenna port of the radio link during the time interval using a transmission power level not exceeding the adjusted MTPL calculated for the respective antenna port of the radio link.

20. The non-transitory computer-readable medium of claim 19, wherein the wireless device is further configured to restrict a total transmission power level via all radio links averaged over the time interval to not exceed a regulatory requirement for radio frequency human exposure.

* * * * *